US010323731B2

(12) United States Patent
Tronquoy et al.

(10) Patent No.: US 10,323,731 B2
(45) Date of Patent: Jun. 18, 2019

(54) PULLEY DEVICE FOR A BELT, INSTALLATION METHOD OF SUCH A DEVICE AND MOTOR VEHICLE EQUIPPED WITH SUCH A DEVICE

(71) Applicant: Aktiebolaget SKF, Gothenburg (SE)

(72) Inventors: Nicolas Tronquoy, Fondettes (FR); Dirk Albrecht, Eschweiler (DE); Alain Gezault, Vineuil (FR); Romuald Lescorail, Mettray (FR)

(73) Assignee: Aktiebolaget SKF, Göteborg (SE)

( * ) Notice: Subject to any disclaimer, the term of this patent is extended or adjusted under 35 U.S.C. 154(b) by 169 days.

(21) Appl. No.: 15/410,334

(22) Filed: Jan. 19, 2017

(65) Prior Publication Data
US 2017/0219068 A1 Aug. 3, 2017

(30) Foreign Application Priority Data
Jan. 29, 2016 (EP) ..................... 16153275

(51) Int. Cl.
*F16H 7/08* (2006.01)
*F16H 7/12* (2006.01)
*F16H 57/00* (2012.01)

(52) U.S. Cl.
CPC ......... *F16H 7/1281* (2013.01); *F16H 7/1218* (2013.01); *F16H 2007/081* (2013.01);
(Continued)

(58) Field of Classification Search
CPC ............ F16H 2007/081; F16H 7/1281; F16H 2007/0844; F16H 2007/0846; F16H 2007/088
(Continued)

(56) References Cited

U.S. PATENT DOCUMENTS 4,472,162 A * 9/1984 Hitchcock ............. F16H 7/1218
  474/117
4,504,254 A * 3/1985 Foster .................. F16H 7/1245
  29/452
(Continued)

FOREIGN PATENT DOCUMENTS

| DE | 10260552 A1 | 7/2004 |
| EP | 1412659 A1 | 9/2005 |
| WO | 2008149390 A1 | 12/2008 |

*Primary Examiner* — Henry Y Liu
(74) *Attorney, Agent, or Firm* — Bryan Peckjian; SKF USA Inc. Patent Dept.

(57) ABSTRACT

A pulley device for a belt that includes an eccentric adjusting member fixed on a support, an eccentric hub rotatably mounted on the eccentric adjusting member, a torsion spring between the eccentric adjusting member and hub to exert a biasing force, and a pulley rotatably mounted on the hub. The hub provides an upper radial surface and the eccentric adjusting member provides a radially outwardly projecting flange formed at an upper end of the eccentric adjusting member and forming an axial abutment for the upper radial surface. The upper radial surface provides a pair of axially projected stops formed integrally within, each stop being dedicated to come into abutment against a corresponding stop provided by the radially outwardly projecting flange of the eccentric adjusting member. The hub further provides engaging means adapted to cooperate with an external tool, the engaging means circumferentially located between the projected stops of the hub.

13 Claims, 4 Drawing Sheets

(52) U.S. Cl.
CPC ............... *F16H 2007/0842* (2013.01); *F16H 2007/0846* (2013.01); *F16H 2007/0865* (2013.01); *F16H 2007/0893* (2013.01); *F16H 2057/0056* (2013.01)

(58) Field of Classification Search
USPC .................................................. 474/112, 135
See application file for complete search history.

(56) References Cited

U.S. PATENT DOCUMENTS

| | | | | |
|---|---|---|---|---|
| 4,563,167 A * | 1/1986 | Foster | F16H 7/1236 | 474/115 |
| 4,571,222 A * | 2/1986 | Brandenstein | F16H 7/1281 | 474/112 |
| 4,605,387 A * | 8/1986 | Okubo | F16H 7/1281 | 474/112 |
| 4,618,335 A * | 10/1986 | Brandenstein | F16H 7/1281 | 474/112 |
| 4,643,700 A * | 2/1987 | Brandenstein | F16C 13/006 | 474/112 |
| 4,784,631 A * | 11/1988 | Henderson | F16H 7/1218 | 474/117 |
| 4,808,148 A * | 2/1989 | Holtz | F16H 7/129 | 474/112 |
| 4,824,421 A * | 4/1989 | Komorowski | F16H 7/1218 | 474/112 |
| 4,832,665 A * | 5/1989 | Kadota | F16H 7/1227 | 474/112 |
| 5,015,216 A * | 5/1991 | Brandenstein | F16H 7/1281 | 474/101 |
| 5,030,171 A * | 7/1991 | Henderson | F16H 7/1218 | 474/135 |
| 5,078,656 A * | 1/1992 | Brandenstein | F16H 7/1281 | 474/112 |
| 5,244,438 A * | 9/1993 | Golovatai-Schmidt | F01L 1/02 | 474/112 |
| 5,254,048 A * | 10/1993 | Gardner | F16H 7/1281 | 474/135 |
| 5,277,667 A * | 1/1994 | Gardner | F16H 7/1281 | 474/135 |
| 5,391,119 A * | 2/1995 | Kondo | F16H 7/1227 | 474/112 |
| 5,470,279 A * | 11/1995 | Brandenstein | F16H 7/1281 | 474/135 |
| 5,820,503 A * | 10/1998 | Bruchner | F16H 7/1281 | 474/112 |
| 5,919,107 A * | 7/1999 | Stepniak | F16H 7/1281 | 474/112 |
| 6,146,301 A * | 11/2000 | Brandenstein | F16H 7/1281 | 474/101 |
| 6,165,091 A * | 12/2000 | Dinca | F16F 9/145 | 474/101 |
| 6,659,896 B1 * | 12/2003 | Stief | F16H 7/1281 | 474/112 |
| 6,699,149 B1 * | 3/2004 | White | F16H 7/18 | 474/118 |
| 6,932,731 B2 * | 8/2005 | Kaiser | F16H 7/1218 | 474/112 |
| 7,285,065 B2 * | 10/2007 | Dinca | F16H 7/1281 | 474/112 |
| 7,874,950 B2 * | 1/2011 | Lehtovaara | F16H 7/1281 | 474/135 |
| 7,951,030 B2 * | 5/2011 | Ward | F16H 7/1218 | 474/112 |
| 7,980,976 B2 * | 7/2011 | Stepniak | F16H 7/1281 | 384/215 |
| 8,142,315 B2 * | 3/2012 | Dell | F16H 7/1218 | 474/135 |
| 8,840,495 B2 * | 9/2014 | Comsa | F01L 1/02 | 474/110 |
| 8,926,462 B2 * | 1/2015 | Ward | F16H 7/12 | 474/112 |
| 8,939,857 B2 * | 1/2015 | Doering | B23D 47/12 | 474/112 |

* cited by examiner

PULLEY DEVICE FOR A BELT, INSTALLATION METHOD OF SUCH A DEVICE AND MOTOR VEHICLE EQUIPPED WITH SUCH A DEVICE

CROSS REFERENCE TO RELATED APPLICATIONS

This application claims priority to European patent application no. 16153275.9 filed on Jan. 29, 2016, the contents of which are fully incorporated herein by reference.

FIELD OF THE INVENTION

The invention relates to a pulley device as, in particular, tensioners to tense a belt for transmitting movements. The pulley device is dedicated to be installed as part of an automotive belt drive system on a motor vehicle.

BACKGROUND OF THE INVENTION

Tensioners are well known devices to apply a constant belt-tensioning force that compensates for increases in belt length due to wear.

Such tensioners generally provide a fixed structure, mounted on a fixed support such as a motor vehicle, and a pivot structure eccentrically mounted on the fixed structure by means of a pivot assembly. The pivot assembly may provide bearing. The pivot structure further provides a pulley structure onto which the belt is engaged.

Such tensioners further provide elastic means, such as a coil spring, that is mounted between the fixed and the pivot structures. The elastic means exert a biasing force between the structures so as to adjust a constant belt tension.

It is known from EP 1 412 659 B1 to provide a temporary coupling structure to be received by the tensioner. The coupling structure permits a temporary coupling between the pivot structure and an eccentric adjusting member on which the pivot structure is mounted for eccentric pivoting movement.

When installing a tensioner according to EP 1 412 659 B1, the eccentric adjusting member and the pivot structure are coupled in rotation in a direction against the biasing force exerted by the biasing member. The belt is then mounted on the tensioner. The eccentric adjusting member and the pivot structure are then coupled in rotation in an opposite direction so that the biasing member is relieved. The eccentric adjusting member and the pivot structure are decoupled. The eccentric adjusting member is then pivoting so as to adjust the belt tension to a predetermined value and is finally tightened onto the support. When the tensioner is installed, the eccentric adjusting member forms the tensioner fixed structure.

However, the tensioner requires a dedicated coupling member that must be installed in a specific position, with the pivot structure and the eccentric adjusting member in a specific relative position.

Each tensioner must be provided with such a coupling member that is thrown away after installation.

BRIEF SUMMARY OF THE INVENTION

The aim of the invention is to resolve these drawbacks by proposing an alternate pulley device whereof the manufacturing and the installation are cost-effective and eased.

To this end, the invention relates to a pulley device for a belt that provides an eccentric adjusting member dedicated to be fixed on a support, an eccentric hub rotatably mounted on the eccentric adjusting member, a torsion spring between the eccentric adjusting member and hub so as to exert a biasing force in a belt-tightening direction, and a pulley rotatably mounted on the hub. The hub provides an upper radial surface and the eccentric adjusting member provides a radially outwardly projecting flange formed at an upper end of the eccentric adjusting member and forming an axial abutment for the upper end radial surface of the hub.

According to the invention, the upper radial surface of the hub provides a pair of axially projected stops that are formed integrally with, each stop being dedicated to come into abutment against a corresponding stop provided by the radially outwardly projecting flange of the eccentric adjusting member when the hub rotates in one direction or the other, so as to couple in rotation the hub and eccentric adjusting member in the direction. The hub further provides engaging means adapted to cooperate with an external tool, the engaging means being circumferentially located between the hub stops.

Thanks to the invention, the hub and the eccentric adjusting member can freely pivot relatively and eccentrically within the rotation area defined by the stops.

The stops are permanently provided to the hub and then are set in a perfect position at design, without any possibility of external interference.

The relative nominal positions for the hub and the eccentric adjusting members during the pulley device installation are predetermined by the exact positioning of the stops.

The engaging means are between the two hub stops and then do not interfere with the eccentric adjusting member. An external is to be received within the engaging means during the pulley device installation so as to set a pivot movement to the hub and is removed after.

The external tool is not permanent and can be a standard tool with a corresponding shape with the installation means. The same tool can be used for pulley devices of a kind.

According to further aspects of the invention which are advantageous but not compulsory, such a mechanical system may incorporate one or several of the following features:

The eccentric adjusting member provides a base plate on a lower end on the opposite side to the upper end that provides the radially outwardly projecting flange with stops, the base plate being dedicated to be attached to the support.

The eccentric adjusting member provides an eccentric shaft provided with a through opening wherein a bolt or stud can be inserted, and a pivot shaft securely mounted onto the eccentric shaft. The radially outwardly projecting flange is formed on the upper end of the eccentric shaft and forms an axial abutment for the pivot shaft.

The pivot shaft provides a lower end with a radially outwardly projecting flange forming an axial abutment for the base plate.

The eccentric adjusting member provides a spring holder interposed between the spring and the base plate.

A bearing is radially interposed between the eccentric adjusting member and the eccentric hub.

The bearing is a bushing or a plain bearing.

A bearing is radially interposed between the eccentric hub and the pulley.

The bearing is a rolling bearing comprising an inner ring, an outer ring and at least one row of rolling elements between the rings. The outer ring supports the pulley and the inner ring is rotatably secured to the hub.

The engaging means consists in an opening able to receive an external tool.

The engaging means consists in an opening of hexagonal shape and is able to receive a standard Allen key.

The angular sector between the two stops provided by the eccentric adjusting member, wherein the hub stops can rotate, is provided between 180° and 340°, and advantageously between 250° and 300°.

The angular sector between the two stops provided by the hub, between which the installation means is provided, is advantageously provided between 20° and 30°.

The pulley device provides marks applied to the hub and/or the eccentric adjusting member that indicate the correct installation position of the eccentric adjusting member relative to the hub, when the hub in its free arm position.

Marks are applied on the upper end of the eccentric adjusting member, each of the marks facing one of the stops provided by the upper end radial surface of the hub when the relative position of the eccentric adjusting member and the hub is in the correct installation position.

Another object of the invention is a motor vehicle equipped with a pulley device as mentioned above, that vehicle comprising an engine whereof a fixed part, such as engine block, constitutes a support for that pulley device. The support itself may be provided with a tapped orifice for receiving a threaded part of the screw.

Another object of the invention is an installation method of a pulley device as mentioned above onto a support. The installation method provides the following steps of:

Initially mounting the pulley device on a support by means of a bolt or stud around which the eccentric adjusting member pivots;

Pivoting the eccentric adjusting member so as to contact the hub stop in a direction in which the biasing force exerted by the torsion spring gets lower when you would turn the hub;

Pivoting the hub and, while the eccentric adjusting member is coupled to the hub by means of abutment contact between the stops, the eccentric adjusting member so that the eccentric adjusting member is moved in a direction in which the biasing force exerted by the torsion spring gets higher, to the installation position of the pulley device;

Holding the coupled hub and eccentric adjusting member in this position and tightening the bolt or the stud so as to fix the eccentric adjusting member to the support;

Releasing the hub and letting it move freely into a free arm position;

Pre-mounting a belt on or around all components of the belt drive system, except at least one pulley device;

Pivoting the hub in the direction in which the biasing force exerted by the torsion spring gets higher to the installation position of the pulley device, when stops of the hub and the eccentric adjusting members are in abutment or very close, and holding it in this position;

Installing the belt on the last pulley device of the system;

Releasing the bolt or the stud;

Pivoting the eccentric adjusting member in the direction in which the biasing force exerted by the torsion spring gets higher so that the pulley device is pressed into forcible engagement with the belt; and Tightening the bolt or stud so as to fix the eccentric adjusting member, and hence the pulley device, in place after the hub has been pivoted into a predetermined tensioning position relative to the belt.

For sake of clarity, the installation position of the pulley device is the end stop of the pulley device. This specific position is set as the physical contact between a part of the hub and the base plate. The installation operator feels a significant increase of the force and the pivot structure cannot move further.

According to a second embodiment of the installation method of a pulley device as mentioned above onto a support, the pulley device provides marks applied to the hub and/or the eccentric adjusting member that indicate the correct installation position of the eccentric adjusting member relative to the hub, when the hub in its free arm position. The installation method differs from the previous installation method in that the steps (b) and (c) are replaced by the following step of pivoting the eccentric adjusting member to the position where marks on the eccentric adjusting member and hub meet.

BRIEF DESCRIPTION OF THE SEVERAL VIEWS OF THE DRAWING

The invention will now be explained in correspondence with the annexed figures, as illustrative examples, without restricting the object of the invention. In the annexed figures.

DETAILED DESCRIPTION OF THE INVENTION

Figure 1:
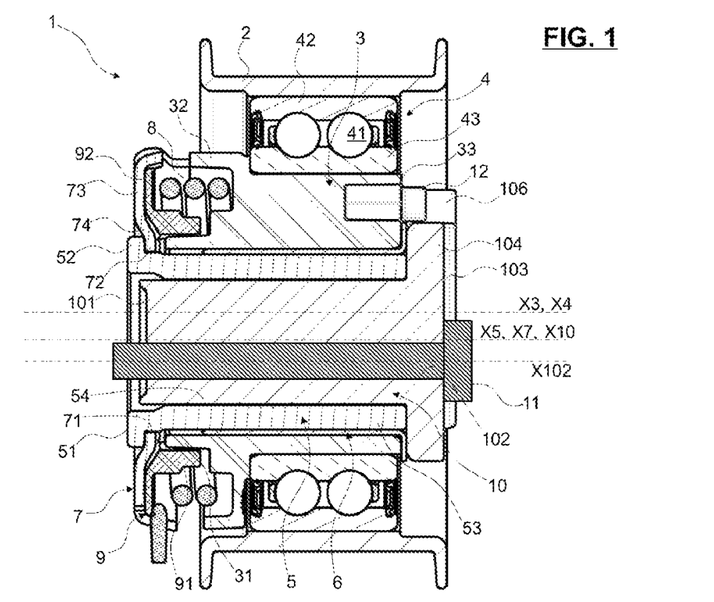
FIG. 1 is a cross-sectional view of a pulley device according to a first embodiment of the invention.
Figure 2:
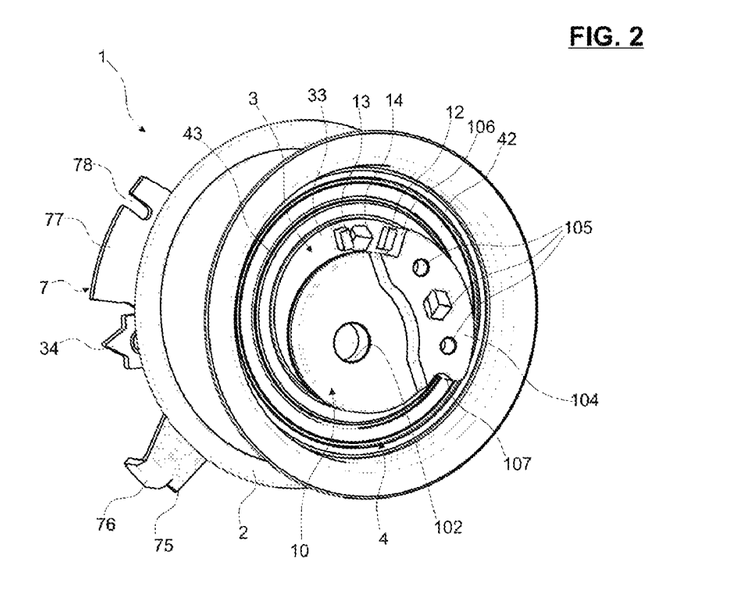
FIG. 2 is a perspective view of a pulley device according to the first embodiment of the invention.

The FIGS. 1 and 2 represent a pulley device 1, more particularly a belt tensioner for a traction member not shown, such as a belt. Such a tensioner 1 can be installed on a support as part of an automotive belt drive system on a motor vehicle. The tensioner 1 provides a pulley 2 rotatably mounted on an eccentric hub 3 of longitudinal axis X3.

The rotation of the pulley 2 relatively to the hub 3 is made possible by a rolling bearing 4 of longitudinal and rotation axis X4. The rolling bearing 4 provides an inner ring 43 rotatably secured to the hub 3, an outer ring 42 rotatably secured to the pulley 2, and two rows of rolling elements 41, here balls, radially interposed between the inner ring 43 and the outer ring 42. The axis X3 and X4 are combined during the normal operative mode of the tensioner 1. Alternatively, not shown, the rolling bearing 4 may provide different rolling elements, such as rollers or needles, and may provide more or less than rows of rolling elements.

In this embodiment and the following ones, the terms "axial" and "radial" are defined in relation to the axis X4 of relative rotation of the inner ring 43 and outer ring 42. Then an axial portion is parallel to this axis of rotation and a radial portion is perpendicular to this axis.

We also define the terms "inner" and "outer" in relation to the axis X4, such as the inner side of the tensioner 1 corresponds to the axis X4 and the outer side is on the opposite of this axis X4 by the tensioner 1.

We also define the terms "lower" and "upper" in relation to the position of the tensioner 1 to its installation support, such as the lower side of the tensioner 1 corresponds to the support and the upper side is on the opposite of the support by the tensioner 1.

The hub 3 is itself rotatably mounted on a pivot shaft 5 of longitudinal axis X5. The axis X3 and X5 are parallel but radially or laterally offset during the normal operative mode of the tensioner 1. Rotation between the pivot shaft 5 and the hub 3 is allowed by a bearing 6. The bearing 6 can be a bushing or a plain bearing, and can be made of an anti-friction material such as PTFE.

The pivot shaft 5 provides a cylindrical body 53 of which an inner end 51 is provided with a radially outwardly projected flange 52 forming a shoulder against which abuts a base plate 7 for attaching the tensioner 1 onto a support of the motor vehicle.

The base plate 7 of longitudinal axis X7 provides a central bore 71 mounted around the cylindrical body 53 of the shaft 5. The base plate provides an inner radial portion 72 abutting against the flange 52 and extending towards the inner end 51 through a radial portion 73 which surround the shaft 5. The radial portions 72 and 73 are slightly axially offset by a step 74 that ensures the centering of the plate 7 relatively to the pivot shaft 5.

The base plate 7 further provides a projecting locating portion 75 that is used to position the tensioner on its support, with a hook 76 dedicated to be inserted within a corresponding recess of the support.

The base plate 7 also provides a projecting extension portion 77 that extends radially outwardly beyond the tensioner 1 so as to be visible by the installing operator during the tensioner installation process. A slot 78 located on the outer periphery of the portion 77 so as to gauge the position of a pointer 34 radially extending from the hub 3, and hence to adjust the belt tightening.

The pivot shaft 5 provides a central bore 54 wherein is inserted and fixed an eccentric shaft 10 of longitudinal axis X10. The eccentric shaft 10 provides a cylindrical body portion 101 and a longitudinal bore 102 of axis X102 axially extending through it. A fixing bolt 11 extends through the longitudinal bore 102 and the eccentric shaft 10 can rotate around the bolt 11. The eccentric shaft 10 rotates around the axis X102, the axis X102 being radially or laterally offset from the longitudinal axis X10.

The eccentric shaft 10 provides an upper end 103 provided with a radially outwardly projected flange 104 that preferably is formed integrally with, but which could be formed separately from and connected to the cylindrical body portion 101. The flange 104 forms a shoulder against which abuts the pivot shaft 5. Engaging means 105 such as openings are provided on the exterior periphery of the flange 104, such engaging means being able to receive an external tool so as to pivot the eccentric shaft 10 during the tensioner installation process in the belt drive system.

The tensioner 1 further provides a torsion spring 8 mounted around a tubular portion 31 of the hub 50 extending, along the longitudinal axis X3, between the hub 3 and the base plate 7. The hub 3 forms a ring-shaped housing 32, in which the spring 8 is mounted, and which extends around the tubular portion 31. The spring 8 is tensioned between a spring stop provided to the hub 3 and a spring stop provided to the base plate 7 so as to generate a biasing tensional force on the belt which rests on the pulley 2.

The tensioner 1 also provides a spring holder 9 interposed, along the longitudinal axis X5, between the spring 8 and the base plate 7.

The spring holder 9 provides a central axial portion 91 which surrounds the tubular portion 31 and which allows centering of the spring holder relatively to the base plate 7.

The axial portion 91 extends through an external radial portion 92 which abuts against the radial portion 73 of the base plate 7.

The base plate 7, the spring support 9, the pivot shaft 5 and the eccentric shaft 10 are dedicated to be fixed on a support once the tensioner 1 is installed and define an eccentric adjusting member around which the hub 3 eccentrically pivots. The eccentric adjusting member can eccentrically pivot around the bolt 11 during the tensioner installation process.

According to the invention, the hub 3 provides an upper radial surface 33 with a pair of axially projected stops 12, 13 that are formed integrally with. The stops 12, 13 may have any suitable shape, for instance a cuboid shape, or a bump. The stops 12 and 13 are separated by an angular sector advantageously provided between 20° and 30°.

Each hub stop 12, 13 is dedicated to come into abutment against a corresponding stop 106, 107 respectively, provided by the radially outwardly projecting flange 104 of the eccentric shaft 10.

According to the invention, the hub 3 further provides engaging means 14 adapted to cooperate with an external tool, the engaging means 14 being circumferentially located between the hub stops 12, 13, in particular in the defined angular sector provided between 20° and 30°.

The angular sector between the two stops 106, 107 provided by the eccentric shaft 10, wherein the hub stops 12, 13 can rotate, is advantageously provided between 250° and 300°.

According to the embodiment shown in FIGS. 1 to 4, the engaging means consist in an opening with a hexagonal shape, able to receive and cooperate with a standard Allen Key. Alternatively, not shown, the engaging means may have any other shape suitable to cooperate with a given external tool.

When an external is inserted in the engaging means 14, a rotating movement can be applied to the hub around the axis X3 and relatively to the eccentric adjusting member, and more particularly to the eccentric shaft 10. When the hub rotates in a clockwise direction, against the biasing force exerted by the torsion spring 8, the hub 3 freely pivots around the axis X3 until the stop 12 comes into abutment against the stop 106. When the hub rotates in a counter-clockwise direction, so as to relieve the torsion spring 8, the hub 3 freely pivots around the axis X3 until the stop 13 comes into abutment against the stop 107.

The external tool never interferes with any of the other parts of the tensioner 1, and never abuts against the eccentric adjusting member. The only role of the external tool is to transmit a rotating movement from the installing operator's hand to the hub 3.

The external tool is not permanent and the same tool can be used for pulley devices of a kind. Advantageously, the same tool can also be used to be inserted within the engaging means 105 of the eccentric shaft 10.

The installation procedure of the tensioner 1 provides the following steps.

Initially, the tensioner 1 is mounted on a support by means of a bolt 11. The hook 76 of the base plate 7 is inserted within a corresponding recess of the support. The bolt is only inserted within a corresponding threaded opening of the support but not tightened. The eccentric shaft 10 can eccentrically pivot around the bolt 11 by using an appropriate external tool cooperating with the engaging means 105.

The eccentric shaft 10 is pivoted in a direction in which the biasing force exerted by the torsion spring 8 gets lower when you would turn the hub 3, ie. in an counter-clockwise direction.

Figure 3A:
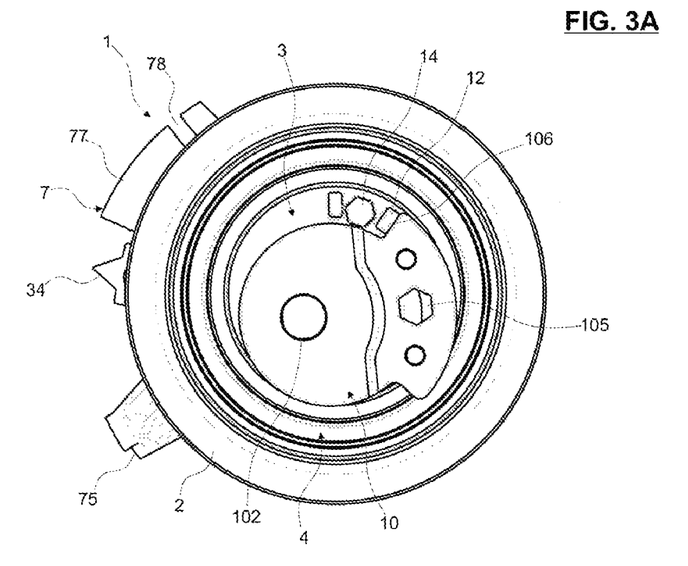
FIGS. 3A to 3C are front plan views of illustrating an installation method of the pulley device according to the first embodiment of the invention.

The stop 106 of the eccentric shaft 10 comes into abutment against the stop 12 of the hub 3, as shown in FIG. 3A.

Figure 3B:
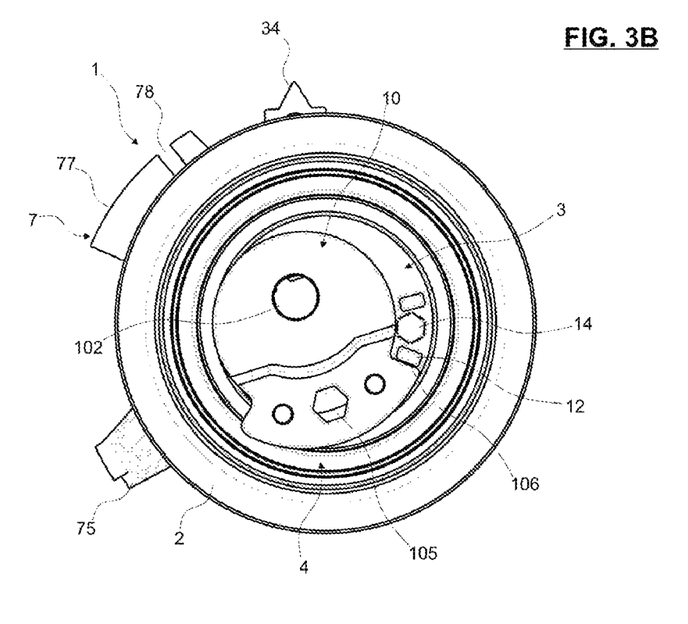

An external tool is inserted in the engaging means 14 of the hub 3, and the hub 3 is put in a rotating movement in a direction against the biasing force applied by the torsion spring 8. Since the stops 12 and 106 are in abutment, the rotating movement of the hub 3 is induced to the eccentric shaft 10. The eccentric shaft 10 is then also moved in the direction, to the installation position of the pulley device, as shown in FIG. 3B. The installation position of the tensioner 1 is the end stop of the tensioner 1. This specific position is set as the physical contact between a part of the hub 3 and the base plate 7. The installation operator feels a significant increase of the force and the hub 3 cannot move further.

The coupled hub 3 and eccentric shaft 10 are hold in this position and the bolt 11 is tightened on the support so as to fix the eccentric shaft 10 to the support. The eccentric shaft 10 and the associated element forming the eccentric adjusting member are fixed and cannot rotate any more.

The hub 3 is released and let it move freely into a free arm position.

A belt is pre-mounted on or around all components of the belt drive system, in particular around the tensioner 1, except at least one pulley device of the system.

An external tool is inserted in the engaging means 14 of the hub 3, and the hub 3 is put in rotation in the direction in which the biasing force exerted by the torsion spring 8 gets higher, to the installation position of the hub 3, when stops 12, 106 of the hub 3 and the eccentric shaft 10 are in abutment or very close. The hub 3 and the eccentric shaft 10 are hold in this position during the installation of the belt on the last pulley device of the system.

The belt is then installed on the belt drive system and the belt tension has to be precisely set during the next steps.

The bolt 11 is released. An external tool is inserted in the engaging means 105 of the eccentric shaft 10 which is put in rotation in the direction in which the biasing force exerted by the torsion spring 8 gets higher, so that the tensioner 1 is pressed into forcible engagement with the belt.

Figure 3C:
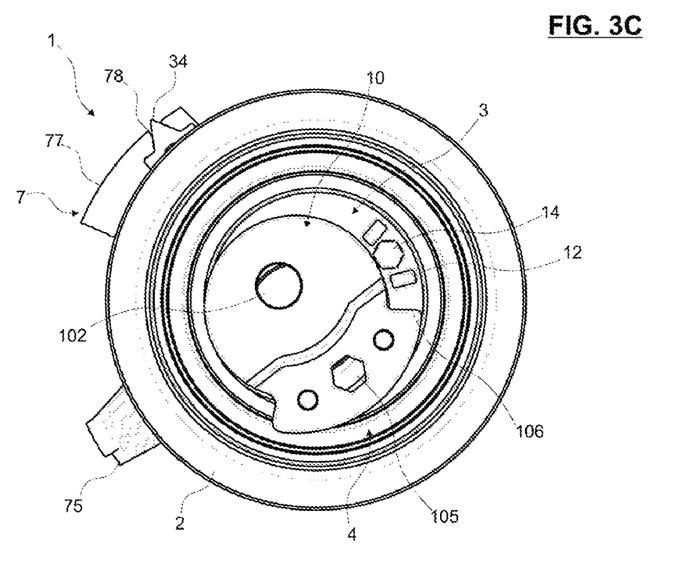

The bolt 11 is finally tightened on the support so as to fix the eccentric adjusting member, and hence the tensioner, in place after the hub 3 has been pivoted into a predetermined tensioning position relative to the belt, as shown in FIG. 3C. The pointer 34 of the hub 3 faces the recess 78 of the base plate indicating that the torsion spring is adjusted so as to apply the desired predetermined tensioning force to the belt.

The tensioner 1 is now in its nominal operating position. The hub 3 is free to pivot about the eccentric adjusting member. When the belt tension decreases, the torsion spring 8 forces the hub 3 to rotate and increase the belt tightening because of the eccentric configuration of the hub 3. On the contrary, when the belt tension increases, the belt forces the hub 3 to rotate against the spring biasing force and decrease the belt tightening due to the eccentric configuration.

Figure 4:
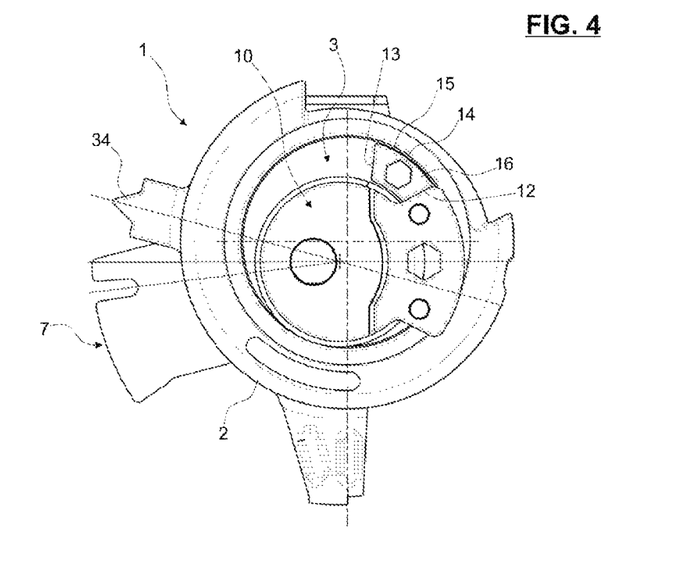
FIG. 4 is a front plan view of a pulley device according to a second embodiment of the invention.

The second embodiment of the invention illustrated in FIG. 4, in which identical elements bear the same references, differs from the first embodiment of FIGS. 1 to 3 in that the stops 12, 13 of the hub 3 consist in two surfaces of a protrusion 15.

The protrusion provides an upper end surface 16 on which is provided the engaging means 14.

Figure 5:
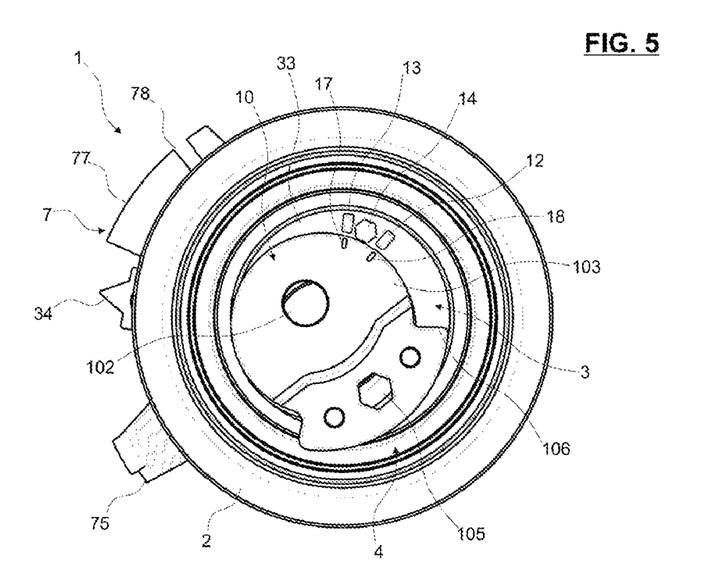
FIG. 5 is a front plan view of a pulley device according to a third embodiment of the invention.

The third embodiment of the invention illustrated in FIG. 5, in which identical elements bear the same references, differs from the first embodiment of FIGS. 1 to 3 in that marks 17, 18 are provided on the tensioner 1 so as to set the correct installation position of the eccentric adjusting member relative to the hub.

A first mark 17 and a second mark 18 are provided on the periphery surface of the upper end 103 of the eccentric shaft 10. The marks 17, 18 may consist in painted lines, slots, bumps or any suitable means.

When the relative position of the hub 3 and the eccentric shaft 10 is set in the correct installation position, the first mark 17 faces the first stop 13 provided on the upper end radial surface 33 of the hub 3 while the second mark 18 faces the second stop 12.

The installation method of the third embodiment of the invention differs from the previous installation method in that the steps to set the installation position are replaced by the step of pivoting the eccentric shaft 10 to the position where marks 17, 18 on the eccentric shaft 10 and the stops 12, 13 of the hub 3 meet.

The invention claimed is:
1. A pulley device for a belt that comprises:
an eccentric adjusting member dedicated to be fixed on a support,
an eccentric hub rotatably mounted on the eccentric adjusting member,
a torsion spring between the eccentric adjusting member and hub so as to exert a biasing force in a belt-tightening direction, and
a pulley rotatably mounted on the hub, wherein
the hub further comprises an upper radial surface and the eccentric adjusting member comprises a radially outwardly projecting flange formed at an upper end of the eccentric adjusting member and forming an axial abutment for the upper radial surface of the hub, wherein
the upper radial surface of the hub comprises a pair of axially projected stops that are formed integrally with, each stop being dedicated to come into abutment against a corresponding stop comprised by the radially outwardly projecting flange of the eccentric adjusting member when the hub rotates in one direction or the other, so as to couple in rotation the hub and eccentric adjusting member in the direction, and wherein
the hub further comprises engaging means adapted to cooperate with an external tool, the engaging means being circumferentially located between the projected stops of the hub.
2. The pulley device according to claim 1, wherein the eccentric adjusting member comprises a base plate on a lower end on the opposite side to the upper end that comprises the radially outwardly projecting flange with stops, the base plate being dedicated to be attached to the support.
3. The pulley device according to claim 2, wherein the eccentric adjusting member comprises a spring holder interposed between the spring and the base plate.
4. The pulley device according to claim 1, wherein the eccentric adjusting member comprises an eccentric shaft provided with a through opening wherein a bolt or stud can be inserted, and a pivot shaft securely mounted onto the eccentric shaft, the radially outwardly projecting flange being formed on an upper end of the eccentric shaft so as to form an axial abutment for the pivot shaft.
5. The pulley device according to claim 4, wherein the pivot shaft comprises a lower end with a radially outwardly projecting flange forming an axial abutment for the base plate.

6. The pulley device according to claim 1, further comprising a bearing being radially interposed between the eccentric adjusting member and the eccentric hub.

7. The pulley device according to claim 1, further comprising a bearing being radially interposed between the eccentric hub and the pulley.

8. The pulley device according to claim 1, wherein the engaging means consists in an opening able to receive an external tool.

9. The pulley device according to claim 1, wherein the eccentric adjusting member further comprises an angular sector disposed between the two stops, and wherein the hub stops can rotate, is between 180° and 340°.

10. The pulley device according to claim 9, wherein the angular sector between the two stops comprised by the hub, between which the installation means is provided, is between 20° and 30°.

11. The pulley device according to claim 1, wherein the pulley device comprises marks applied to the hub and/or the eccentric adjusting member that indicate the correct installation position of the eccentric adjusting member relative to the hub, when the hub in its free arm position.

12. The pulley device according to claim 11, wherein marks are applied on the upper end of the eccentric adjusting member, each of the marks facing one of the stops comprised by the upper radial surface of the hub when the relative position of the eccentric adjusting member and the hub is in the correct installation position.

13. A motor vehicle comprising:
a pulley device having an eccentric adjusting member dedicated to be fixed on a support, an eccentric hub rotatably mounted on the eccentric adjusting member, a torsion spring between the eccentric adjusting member and hub so as to exert a biasing force in a belt-tightening direction, and a pulley rotatably mounted on the hub, wherein the hub further comprises an upper radial surface and the eccentric adjusting member comprises a radially outwardly projecting flange formed at an upper end of the eccentric adjusting member and forming an axial abutment for the upper radial surface of the hub, wherein the upper radial surface of the hub comprises a pair of axially projected stops that are formed integrally with, each stop being dedicated to come into abutment against a corresponding stop comprised by the radially outwardly projecting flange of the eccentric adjusting member when the hub rotates in one direction or the other, so as to couple in rotation the hub and eccentric adjusting member in the direction, and wherein the hub further comprises engaging means adapted to cooperate with an external tool, the engaging means being circumferentially located between the projected stops of the hub, and
an engine, and wherein
a fixed part, such as engine block, constitutes a support for that pulley device.

* * * * *